United States Patent
Liu et al.

(10) Patent No.: US 10,946,459 B2
(45) Date of Patent: Mar. 16, 2021

(54) MAGNETORHEOLOGICAL SUPPORT METHOD FOR BLISK PROCESSING

(71) Applicant: DALIAN UNIVERSITY OF TECHNOLOGY, Liaoning (CN)

(72) Inventors: Haibo Liu, Liaoning (CN); Qi Luo, Liaoning (CN); Junpeng Wang, Liaoning (CN); Te Li, Liaoning (CN); Kuo Liu, Liaoning (CN); Yongqing Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/766,557

(22) PCT Filed: Sep. 29, 2019

(86) PCT No.: PCT/CN2019/108840
§ 371 (c)(1),
(2) Date: May 22, 2020

(87) PCT Pub. No.: WO2020/192058
PCT Pub. Date: Oct. 1, 2020

(65) Prior Publication Data
US 2020/0376571 A1 Dec. 3, 2020

(30) Foreign Application Priority Data
Mar. 27, 2019 (CN) .......................... 201910235052.X

(51) Int. Cl.
*B23C 3/18* (2006.01)
*B23P 15/02* (2006.01)
(Continued)

(52) U.S. Cl.
CPC ................ *B23C 3/18* (2013.01); *B23P 15/02* (2013.01); *B23P 15/06* (2013.01); *F01D 5/141* (2013.01);
(Continued)

(58) Field of Classification Search
CPC . B23P 15/02; B23P 15/06; B23Q 3/00; B23Q 3/06
See application file for complete search history.

(56) References Cited

FOREIGN PATENT DOCUMENTS

| CN | 101912990 A | 12/2010 |
| CN | 203636400 U | 6/2014 |

(Continued)

OTHER PUBLICATIONS

CN-109940415-A English translation (Year: 2019).*

*Primary Examiner* — Jason L Vaughan
*Assistant Examiner* — Amanda Kreiling
(74) *Attorney, Agent, or Firm* — Muncy, Geissler, Olds & Lowe, P.C.

(57) ABSTRACT

A magnetorheological support method for blisk processing is disclosed. In the method, a fork structure and a soft film are used to wrap magnetorheological fluid. The magnetorheological fluid is used for flow filling under certain pressure. The bulged soft film can conduct shape matching on the surface of a blisk blade. The magnetorheological fluid can be cured through magnetic field excitation, thereby ensuring the flexible support for a weak rigid component. Electric permanent magnets are symmetrically arranged at both ends of the fork structure to construct a uniform magnetic field that can realize a global excitation of magnetorheological fluid, so that the magnetorheological fluid works in a shear mode to achieve damping force controlling
(Continued)

by magnetic field. The solid-liquid conversion of the magnetorheological fluid is controlled by an electric permanent magnet field.

1 Claim, 1 Drawing Sheet

(51) Int. Cl.
*B23P 15/06* (2006.01)
*F01D 5/14* (2006.01)
*F04B 45/08* (2006.01)
*G05B 19/402* (2006.01)

(52) U.S. Cl.
CPC ............ *F04B 45/08* (2013.01); *G05B 19/402* (2013.01); *B23C 2215/04* (2013.01); *F05D 2230/60* (2013.01); *G05B 2219/49203* (2013.01)

(56) References Cited

FOREIGN PATENT DOCUMENTS

| | | | | |
|---|---|---|---|---|
| CN | 104625822 A | 5/2015 | | |
| CN | 205271486 U | 6/2016 | | |
| CN | 106002374 A | 10/2016 | | |
| CN | 106514369 A | 3/2017 | | |
| CN | 107030522 A | 8/2017 | | |
| CN | 108673211 A | 10/2018 | | |
| CN | 108788847 A | 11/2018 | | |
| CN | 109940415 A | * 6/2019 | ............... | B23Q 3/06 |
| WO | WO-2011/054393 A1 | 5/2011 | | |

* cited by examiner

MAGNETORHEOLOGICAL SUPPORT METHOD FOR BLISK PROCESSING

TECHNICAL FIELD

The present invention belongs to the technical field of processing, and particularly relates to a magnetorheological support method for blisk processing.

BACKGROUND

The blisk is a key part of a high-performance aero-engine, and requires numerical control machining of thin-walled blades with complex shapes on nickel-based superalloy or titanium alloy blank of die forging. However, the blisk blade has the geometric features of wide chord, vane sweep and deep internal chamber. In actual processing (especially in the finishing stage), the blade is often in a cantilever state, which makes cutting chatter easily appear and further causes machined surface chatter marks and tool breakage. To this end, the use of effective auxiliary support has important engineering value for improving the processing accuracy and efficiency of the blisk blade.

Magnetorheological fluid is an intelligent material with controllable morphology, can be cured rapidly (millisecond level) when excited by an applied magnetic field, so as to easily realize reversible liquid-solid phase transition at normal temperature. Therefore, magnetorheological fluid can not only flexibly fill the gap between blades and positioning element due to its fluidity, but also achieve local or overall curing support through a controllable magnetic field. In recent years, magnetorheological fluid has been applied in the fields of magnetorheological damping, magnetorheological machining and magnetorheological actuation. Some scholars apply the magnetorheological fluid in flexible clamping of parts, which can provide a flexible solution for supporting and clamping complex thin-wall parts.

In 2010, Shenyang Limning Aero-Engine (Group) Corporation Ltd. proposed a method for vibration reduction of blisk milling in patent CN101912990A. By filling fillers between blisks, the support rigidity of the parts is enhanced during blade milling. However, in the milling process, the fillers become chips with the tool cutting and coolant flowing. This makes it difficult to recover the fillers and reuse the coolant. In 2013, China Gas Turbine Establishment proposed a fixture for numerical control rough machining of a blisk in patent CN203636400U. The supporting location of the blisk is changed from the traditional web side to the end of inlet and outlet air duct, which effectively increases the processing efficiency and the service life of the tool and reduces the production cost, but the processing accuracy is low. In 2015, China Gas Turbine Establishment proposed an improved fixture for numerical control machining of blisk with drums at both ends in patent CN205271486U. Vertical support force is provided on the end surfaces of the drums of the blisk, which improves processing stability, surface quality and dimensional accuracy of the parts, but the fixture is complicated and the clamping process is cumbersome.

However, the above research does not mention the magnetorheological support device and the method for stable processing of the blisk blade.

SUMMARY

A main technical problem to be solved in the present invention is to overcome the defects of the above method, and invent a magnetorheological support method for blisk processing with respect to the problem of poor processing accuracy caused by weak local rigidity in the processing of the blisk. In the method, a fork structure and a soft film are used to wrap magnetorheological fluid. The magnetorheological fluid is used for flow filling under certain pressure. The bulged soft film can conduct shape matching on the surface of a blisk blade. The magnetorheological fluid can be cured through magnetic field excitation, thereby ensuring the flexible support for a weak rigid component. Electric permanent magnets are symmetrically arranged at both ends of the fork structure to construct a uniform magnetic field that can realize a global excitation of magnetorheological fluid, so that the magnetorheological fluid works in a shear mode to achieve damping force controlling by magnetic field. The solid-liquid conversion of the magnetorheological fluid is controlled by an electric permanent magnet field. The automation of the magnetorheological support can be realized in the processing of the blisk blade through the automatic dividing of a turntable and the automatic transportation of a magnetorheological soft film.

The technical solution adopted by the present invention is: a magnetorheological support method for blisk processing, wherein in the method, a fork structure and a soft film are used to wrap magnetorheological fluid. The magnetorheological fluid is used for flow filling under certain pressure. The bulged soft film can conduct shape matching on the surface of a blisk blade. The magnetorheological fluid can be cured through magnetic field excitation, thereby ensuring the flexible support for a weak rigid component. Electric permanent magnets are symmetrically arranged at both ends of the fork structure to construct a uniform magnetic field that can realize a global excitation of magnetorheological fluid, so that the magnetorheological fluid works in a shear mode to achieve damping force controlling by magnetic field. The solid-liquid conversion of the magnetorheological fluid is controlled by an electric permanent magnet field. Automatic magnetorheological flexible support of all blades is realized in the processing of the blisk blade through the automatic dividing of an indexing turntable and the automatic transportation of a magnetorheological soft film. Specific steps of the method are as follows:

Step 1, assembling a magnetorheological fluid supporting device

The magnetorheological fluid supporting device is composed of two parts: a linear feed mechanism I and a magnetorheological support II;

Firstly, installing the linear feed mechanism I; installing two linear guides 5 on a fixing bench 4; then installing a sliding seat 6 on the two linear guides 5; fastening a bracket 7 of screw on the fixing bench 4 by using a screw; installing a support frame 8 on a T groove of the sliding seat 6 by using a T bolt; installing one end of the ball screw 9 in the bracket 7 of screw, and installing the other end of the ball screw 9 in a motor base 10 on the fixing bench 4; connecting a motor 12 with the ball screw 9 through a coupling 11;

Then, installing the magnetorheological support II which is composed of a skeleton 13, a permanent magnet 14, a soft film 15 and a pipe clamp 16 which are installed on the support frame 8, as well as a peristaltic pump 17 and magnetorheological fluid 18; wrapping the soft film 15 outside a skeleton 13 so that the soft film 15 is in close fitting with the edge of the permanent magnet 14; sealing the soft film on a cylinder 13a by using a clamp 16 for hold rubber tubing; arranging a magnetorheological fluid channel 13c in the cylinder 13a and a crossbeam 13b connected with the cylinder; leading one end of the magnetorheological fluid channel 13c to the interior of the soft film 15, and connecting the other end with the peristaltic pump 17; and connecting the peristaltic pump 17 with the magnetorheological fluid 18;

Step 2, placing a blisk 3 on a three jaw chuck 2 of a NC rotary table 1 to complete positioning clamping; during clamping, appropriately adjusting the height and the angle of the NC rotary table 1 so that two blades on the outermost side of the blisk 3 adapt to the location of the magnetorheological support II;

Step 3, moving the magnetorheological support II to a suitable location between the two blades 3a and 3b by using the linear feed mechanism I; turning on a switch of the peristaltic pump 17; filling the magnetorheological fluid 18 into the soft film 15 under certain pressure; allowing the soft film 15 to generate elastic bulging and shape matching with the contour of the blade 3a; and completing the sealing of the magnetorheological fluid by using the pipe clamp 16;

Step 4, turning on the switch of the permanent magnet 14; conducting excitation curing for the magnetorheological fluid 18 in the soft film 15; keeping the current shape of the soft film 15 to realize conformal flexible support for the surface on one side of the blade 3a; controlling, by a numerical control machine, a milling cutter to process the other side shape of the blade 3a to be processed; after completing the processing of the current supported blade 3a, turning off a control switch of the permanent magnet 14; an excitation magnetic field disappearing; and restoring the magnetorheological fluid 18 in the soft film 15 to the liquid state;

Step 5, controlling the peristaltic pump 17 to pump out the magnetorheological fluid 18 so that the volume of the soft film 15 is reduced; moving the magnetorheological support II through the linear feed mechanism I to separate from the blisk 3; rotating the blisk 3 through the NC rotary table 1 by a certain angle to rotate the next blade 3b to a processing station; and continuously repeating the above steps to realize the magnetorheological flexible support in the processing of all the blisk blades.

The present invention has the effects: the fork structure and the soft film are used to wrap the magnetorheological fluid. The magnetorheological fluid is used for flow filling under certain pressure. The bulged soft film can conduct shape matching on the surface of the blisk blade. The magnetorheological fluid is subjected to excitation curing, thereby ensuring the flexible support for the weak rigid component and enhancing the local rigidity. Electric permanent magnets symmetrically arranged at both ends of the fork structure are used to construct a uniform magnetic field that can realize the global excitation of the magnetorheological fluid, so that the magnetorheological fluid works in a shear mode to achieve the purpose of controlling a damping force by an applied magnetic field. The solid-liquid conversion of the magnetorheological fluid is controlled by the electric permanent magnet field, thereby realizing solid-liquid controllability of the magnetorheological fluid. In the liquid state, shape matching between the support module and the curved surface of the blade can be ensured, and in the solid state, the blade is supported and the support effect is good. The automation of the magnetorheological support can be realized in the processing of the blisk blade through automatic dividing of a turntable and the automatic transportation of a magnetorheological soft film. In pouring the magnetorheological fluid, the clamp for hold rubber tubing is adopted to realize sealing. The NC rotary table is accurate in positioning. Accurate dividing is conducted for each station through the rotation of the turntable, and the processing accuracy is high.

DETAILED DESCRIPTION

The embodiments of the present invention are described in detail in combination with drawings and the technical solution.

Figure 1:
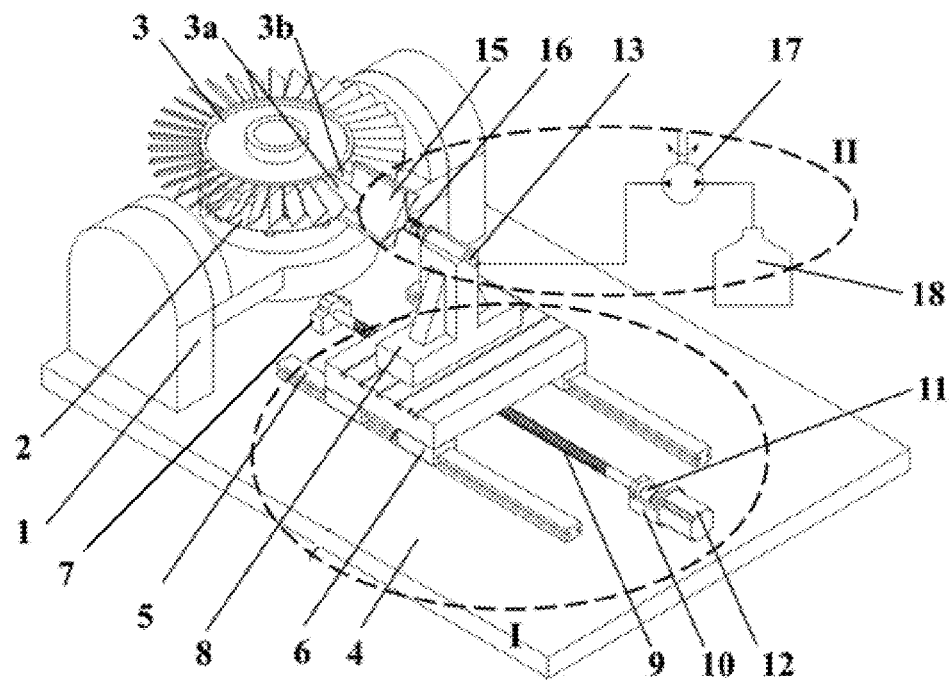
FIG. 1 is an overall structural schematic diagram of a magnetorheological fluid supporting device, wherein 1—NC rotary table; 2—three jaw chuck; 3—blisk; 3a—current processing blade; 3b—next processing blade; 4—fixing bench; 5—linear guide; 6—sliding seat; 7—mobile platform; 8—support frame; 9—ball screw; 10—motor base; 11—coupling; 12—motor; 13—skeleton; 15—soft film; 16—pipe clamp; 17—peristaltic pump; and 18—magnetorheological fluid.
Figure 2:
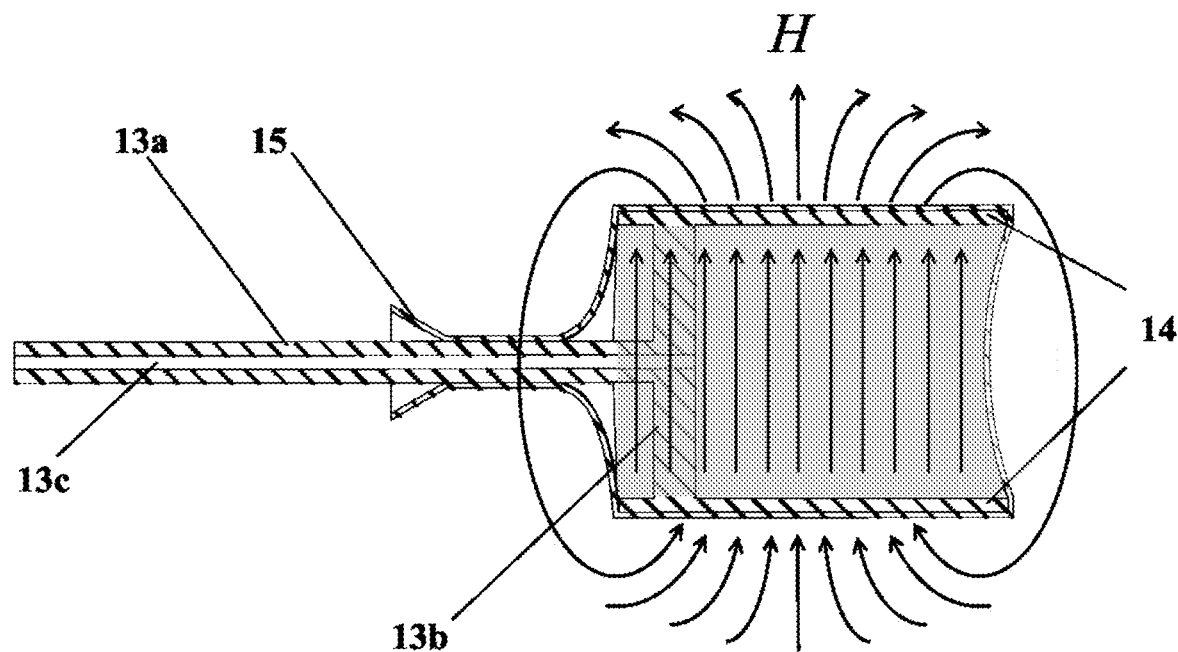
FIG. 2 is a sectional view of a magnetorheological support II, wherein 13—skeleton; 13a—skeleton cylinder; 13b—skeleton beam; 13c—magnetorheological fluid channel; 14—permanent magnet; and 15—soft film.

In the embodiments, FIG. 1 is an overall structural schematic diagram of a magnetorheological fluid supporting device, and FIG. 2 is a sectional view of a magnetorheological support II. A skeleton 13 is made of non-magnetic aluminum alloy material; a permanent magnet 14 is made of RuFeB ferromagnetic material; and the permanent magnet 14 includes a magnetic switch. The magnetorheological fluid 18 is prepared from carbonyl iron powder of 40% volume fraction and silicone oil of 60% volume fraction, and has a density of 3.55 g/ml.

Assembling steps of the magnetorheological fluid supporting device are as follows:

Firstly, installing the linear feed mechanism I; installing linear guides 5 on a fixing bench 4; then installing a sliding seat 6 on the linear guides 5; fastening a bracket 7 of screw on the fixing bench 4 by using a screw; installing and fixing a ball screw 9 between the bracket 7 of screw and a motor base 10; installing a support frame 8 in a T groove of the sliding seat 6 by using a T bolt; and connecting the ball screw 9 with a motor 12 by using a coupling 11;

Then, installing the magnetorheological support II which is composed of a skeleton 13, a permanent magnet 14, a soft film 15 and a pipe clamp 16 which are installed on the support frame 8, as well as a peristaltic pump 17 and magnetorheological fluid 18; wrapping the soft film 15 outside a skeleton 13 so that the soft film 15 is in close fitting with the edge of the permanent magnet 14; sealing the soft film on a cylinder 13a by using a clamp 16 for hold rubber tubing; arranging a magnetorheological fluid channel 13c in the cylinder 13a and a crossbeam 13b connected with the cylinder; leading one end of the magnetorheological fluid channel 13c to the interior of the soft film 15, and connecting the other end with the peristaltic pump 17; and connecting the peristaltic pump 17 with the magnetorheological fluid 18. Because a certain deflection angle exists between the blades of a blisk 3, when the magnetorheological support II is assembled, the angle is adjusted so that the magnetorheological support II can move between two blades and do not interfere with the blades.

The above magnetorheological fluid supporting device is used for magnetorheological flexible support for the blades in the processing of the blisk. The method comprises the following specific steps:

Step 1, placing the blisk 3 on a three jaw chuck 2 of a NC rotary table 1 to complete positioning clamping; when inserting a chuck spanner into a square hole of the three jaw chuck 2 for rotation, driving three jaws to be close to the center, and completing self centering while clamping the central cylindrical structure of the blisk 3; during clamping, appropriately adjusting the height and the angle of the NC rotary table 1; and moving the magnetorheological support II between the outermost blade 3a to be processed and the next blade 3b to be processed according to the blade height of the blisk 3.

Step 2, allowing the soft film 15 to be in austerity when not filled with the magnetorheological fluid 18; moving the magnetorheological support II to a suitable location between the two blades 3a and 3b by using the linear feed mechanism I; turning on a switch of the peristaltic pump 17; filling the magnetorheological fluid 18 into the soft film 15 under certain pressure; making rotational speed at 100 rpm; allowing the soft film 15 to generate elastic bulging and shape matching with the contour of the blade 3a; and completing the sealing of the magnetorheological fluid by using the pipe clamp 16; and fastening the pipe clamp 16 by two semi-cylindrical aluminum alloys through screws.

Step 3, turning on the switch of the permanent magnet 14; conducting excitation curing for the magnetorheological fluid 18 in the soft film 15; keeping the current shape of the soft film 15 to realize conformal flexible support for the surface on one side of the blade 3a; controlling, by a numerical control machine, a milling cutter to process the other side shape of the blade 3a to be processed; after completing the processing of the current supported blade 3a, turning off a control switch of the permanent magnet 14; an excitation magnetic field disappearing; and restoring the magnetorheological fluid 18 in the soft film 15 to the liquid state.

Step 4, controlling the peristaltic pump 17 to reverse and pump out the magnetorheological fluid 18 so that the volume of the soft film 15 is reduced; separating the magnetorheological support II from the blisk 3 through the linear feed mechanism I, wherein the blisk 3 has 36 blades, and the angle difference between every two blades is $\theta=10°$; thus, after processing the blade 3a which is to be processed, rotating the blisk 3 through the NC rotary table 1 by 10° to rotate the next blade 3b to a processing station; and continuously repeating the above steps to realize the magnetorheological flexible support for all the blades in the processing of the blisk.

In the magnetorheological support method for processing of the blisk blades in the present invention, through the supporting device of the present invention, the magnetorheological fluid can be in close fitting with the curved surfaces of the blades in the liquid state; and after the magnetic field is applied, effective curing support can be provided for the curved surfaces, so as to realize precise milling. Through the linear feed mechanism and the dividing control of the NC rotary table, high-accuracy processing for all the blades of the blisk is realized. The method has good support effect, enhances the local rigidity, has high processing accuracy, and realizes automatic magnetorheological support in the processing of the blisk blades.

The invention claimed is:

1. A magnetorheological support method for blisk processing, using a fork structure and a soft film to wrap magnetorheological fluid, wherein the magnetorheological fluid is used for flow filling under certain pressure; the bulged soft film can conduct shape matching on the surface of a blisk blade; the magnetorheological fluid can be cured through magnetic field excitation, thereby ensuring the flexible support for a weak rigid component; electric permanent magnets are symmetrically arranged at both ends of the fork structure to construct a uniform magnetic field that can realize a global excitation of magnetorheological fluid, so that the magnetorheological fluid works in a shear mode to achieve damping force controlling by magnetic field; the solid-liquid conversion of the magnetorheological fluid is controlled by an electric permanent magnet field; automatic magnetorheological flexible support of all blades is realized in the processing of the blisk blade through the automatic dividing of an indexing turntable and the automatic transportation of a magnetorheological soft film; specific steps of the method are as follows:

step 1, assembling a magnetorheological fluid supporting device the magnetorheological fluid supporting device is composed of two parts: a linear feed mechanism and a magnetorheological support;

firstly, installing the linear feed mechanism; installing two linear guides on a fixing bench; then installing a sliding seat on the two linear guides; fastening a screw bracket on the fixing bench by using a screw; installing a support frame on a T groove of the sliding seat by using a T bolt; installing one end of the ball screw in the screw bracket, and installing the other end of the ball screw in a motor base on the fixing bench; connecting a motor with the ball screw through a coupling;

then, installing the magnetorheological support which is composed of a skeleton, a permanent magnet, a soft film and a pipe clamp which are installed on the support frame, as well as a peristaltic pump and magnetorheological fluid; wrapping the soft film outside a skeleton so that the soft film is in close fitting with the edge of the permanent magnet; sealing the soft film on a cylinder by using a pipe clamp for hold rubber tubing; arranging a magnetorheological fluid channel in the cylinder and a crossbeam connected with the cylinder; leading one end of the magnetorheological fluid channel to the interior of the soft film, and connecting the other end with the peristaltic pump; and connecting the peristaltic pump with the magnetorheological fluid;

step 2 placing a blisk on a three jaw chuck of a NC rotary table to complete positioning clamping; during clamping, appropriately adjusting the height and the angle of the NC rotary table so that two blades on the outermost side of the blisk adapt to the location of the magnetorheological support;

step 3 moving the magnetorheological support to a suitable location between the two blades and by using the linear feed mechanism; turning on a switch of the peristaltic pump; filling the magnetorheological fluid into the soft film under certain pressure; allowing the soft film to generate elastic bulging and shape matching with the contour of the blade; and completing the sealing of the magnetorheological fluid by using the pipe clamp;

step 4 turning on the switch of the permanent magnet; conducting excitation curing for the magnetorheological fluid in the soft film; keeping the current shape of the soft film to realize conformal flexible support for the surface on one side of the blade; controlling, by a numerical control machine, a milling cutter to process the other side shape of the blade (3a) to be processed; after completing the processing of the current supported blade; turning off a control switch of the permanent magnet; an excitation magnetic field disappearing; and restoring the magnetorheological fluid in the soft film to the liquid state;

step 5 controlling the peristaltic pump to pump out the magnetorheological fluid so that the volume of the soft film is reduced; moving the magnetorheological support through the linear feed mechanism to separate from the blisk; rotating the blisk through the NC rotary table by a certain angle to rotate the next blade to a processing station; and continuously repeating the above steps to realize the magnetorheological flexible support in the processing of all the blisk blades.

* * * * *